Feb. 14, 1950 C. K. GIERINGER ET AL 2,497,404

FREQUENCY RESPONSIVE CONTROL CIRCUIT

Filed Feb. 5, 1947 3 Sheets-Sheet 1

Inventors
Carl K. Gieringer
Arthur G. Billen
By Wood, Arey, Herron & Evans
Attorneys Feb. 14, 1950 C. K. GIERINGER ET AL 2,497,404

FREQUENCY RESPONSIVE CONTROL CIRCUIT

Filed Feb. 5, 1947 3 Sheets-Sheet 2

Inventors
Carl K. Gieringer
Arthur D. Billen
By
Wood, Arey, Herron & Evans
Attorneys Feb. 14, 1950 C. K. GIERINGER ET AL 2,497,404

FREQUENCY RESPONSIVE CONTROL CIRCUIT

Filed Feb. 5, 1947 3 Sheets-Sheet 3

Inventors

Carl K. Gieringer

Arthur D. Billen

By

Wood, Arey, Herron & Evans

Attorneys

Patented Feb. 14, 1950 2,497,404

UNITED STATES PATENT OFFICE 2,497,404

FREQUENCY RESPONSIVE CONTROL CIRCUIT

Carl K. Gieringer and Arthur G. Billin, Cincinnati, Ohio, assignors to The Liebel-Flarsheim Company, Cincinnati, Ohio, a corporation of Ohio Application February 5, 1947, Serial No. 726,472

16 Claims. (Cl. 250—36)

This invention relates to oscillator circuits of the type employed in diathermy machines, high frequency heaters and various other devices which are used for medicinal, industrial and other purposes. The primary objective of the invention has been to provide apparatus capable of operating within a predetermined narrow frequency band in order that the operation of the apparatus will not interfere with communication channels at other frequencies assigned by the Federal Communications Commission. More specifically, the invention contemplates a short wave generator which is capable of operating with minimum variation from an assigned or predetermined frequency, independently of any misoperation by a doctor, nurse, or technician. The invention is disclosed particularly in relation to a diathermy machine circuit and, as described herein, performs within a variation of plus or minus one-third of one percent, but the apparatus is suitable for other purposes and for operation within even narrower limits of frequency variation.

A conventional short wave oscillator varies in frequency according to the impedance of the load connected to the machine, and according to the coupling of the generator with the output circuit. Under fixed load impedance conditions of operation and with proper care and attention, the conventional, well-designed oscillator has sufficient frequency stability to stay within a prescribed wave band. However, if a machine is misoperated, if the load impedance changes suddenly, or if the machine is not adjusted properly with respect to its load, then a frequency shift or variation will occur which will be more or less severe according to the extent of the improper coupling and mistuning. For instance, in a diathermy machine, should the controls be set for a high resistance patient circuit condition, and then should the operator inadvertently place the electrodes near each other in such a way as to approach resonance in the circuit, the frequency will deviate well beyond the present limits set by the Federal Communications Commision.

It is the purpose of the device of the present invention to render an oscillator incapable of continuing to operate should frequency variations of such magnitude tend to occur, or to monitor the oscillator for the purpose of confining its operation to a prescribed frequency band. The invention also contemplates a circuit in which a bell, buzzer or other suitable signal device is energized whenever the machine is decommissioned or departs from assigned frequency in order that the operator may be warned to readjust the apparatus. In addition, a cooperative control device is contemplated which may be used in conjunction with the frequency controller apparatus to protect the tubes of the generator circuit against becoming overloaded or becoming damaged in consequence of improper output circuit loading.

The present invention, briefly, is predicated upon the fact that the voltage across a tuned circuit is maximum at resonance frequency thereof and drops off rapidly as the frequency deviates above or below the point of resonance. In accordance with the present invention, a radio frequency voltage from the oscillator is applied through a high impedance to a tuned circuit such that the voltage across the tuned circuit is maximum when the oscillator frequency and the resonant frequency of the tuned circuit are at a predetermined or assigned value. When the oscillator frequency deviates from this assigned or predetermined value, either by increase or decrease, the voltage across the tuned circuit will decrease at a rate depending upon the characteristics of the tuned circuit. However, the high frequency response of a simple resonant circuit coupled to an oscillator is of such a nature that the rate of change of voltage in the resonant circuit decreases rapidly as the frequency of the oscillator deviates from resonant circuit frequency. Near resonant frequency, the slope of the response curve is quite steep, but with further deviations in frequency, the curve is of much less slope and the resonant circuit therefore is much less selective. It is the purpose of the present invention to provide an arrangement whereby an overall or net effective response is obtained having a substantially uniform and selective characteristic, that is, to provide a circuit in which the net effective response is more sensitive than the response exhibited by a simple resonant circuit.

In the utilization of such governing factors, one suitable circuit adapted to be employed involves rectification of a part of the voltage across the tuned circuit for the purpose of causing current to flow through one winding of a differential control relay. This current also is caused to flow through resistance for the purpose of providing a bias voltage which is applied to the control grid of a triode tube. In the preferred embodiment, the plate of the triode tube is connected to the input from the oscillator, for a source of radio frequency plate voltage, and the plate current of the triode tube is caused to flow through the other winding of the differential relay, the magnitude of the plate current being governed by the bias on the grid of the triode tube. Thus, the circuit is so arranged that when the current of the tuned circuit is maximum, and, correspondingly when the grid bias voltage for the triode tube is maximum, the plate current of the triode tube is at a minimum value. Otherwise expressed, a typical frequency controller adapted to be used in the practice of the invention comprises a resonant circuit having a portion of its voltage rectified for energization of one of the coils of the differential relay while the second portion of the frequency control device includes a triode tube through which the second differential winding of the controller relay is energized, but energized only in accordance with the bias voltage which is proportional to the voltage of the tuned circuit. The windings of the differential relay are arranged to generate opposing fluxes, and the relay, wherein the currents of the two coils produce opposed magnetomotive forces, operates a control switch or other device when the difference between the currents in the first and second circuits of the frequency controller reaches a predetermined amount, independently of the actual values of the currents. Thus, variations in the current of the resonant circuit, which conform to the variations in the voltage of the oscillator, are utilized to produce variations in the grid bias of a triode tube by which magnetomotive forces generated in the differential relay are compounded to produce a sensitizing or selective effect which is unaffected by substantial voltage variations of the generator but is critically responsive to variations in the frequency thereof within a very narrow wave band.

In operation of the apparatus, when the frequency of the oscillator deviates from resonance, the current in the tuned circuit of the frequency controller will decrease, thereby producing less flux in the first coil of the differential relay. This decrease in current also is manifest in the bias resistor; hence, the triode tube is subject to less bias and therefore, more plate current is allowed to flow therein to produce an increased flux in the second coil of the differential relay. When the net effective flux in the differential relay reaches a predetermined value, or that is, when the difference between the currents in the first and second circuits of the frequency controller just described has reached a predetermined amount, the relay is actuated to operate a switch for decommissioning the oscillator circuit, or to actuate other suitable control devices. Such a result is obtained whether the frequency deviation is above or below normal frequency, since voltage of the resonant circuit is a maximum only at resonance.

From the foregoing brief description of the principles upon which the invention is predicated and from the following detailed description of the drawings in which a typical embodiment of the improvement is disclosed, those skilled in the art readily will comprehend various modifications to which the invention is susceptible.

Figure 1:
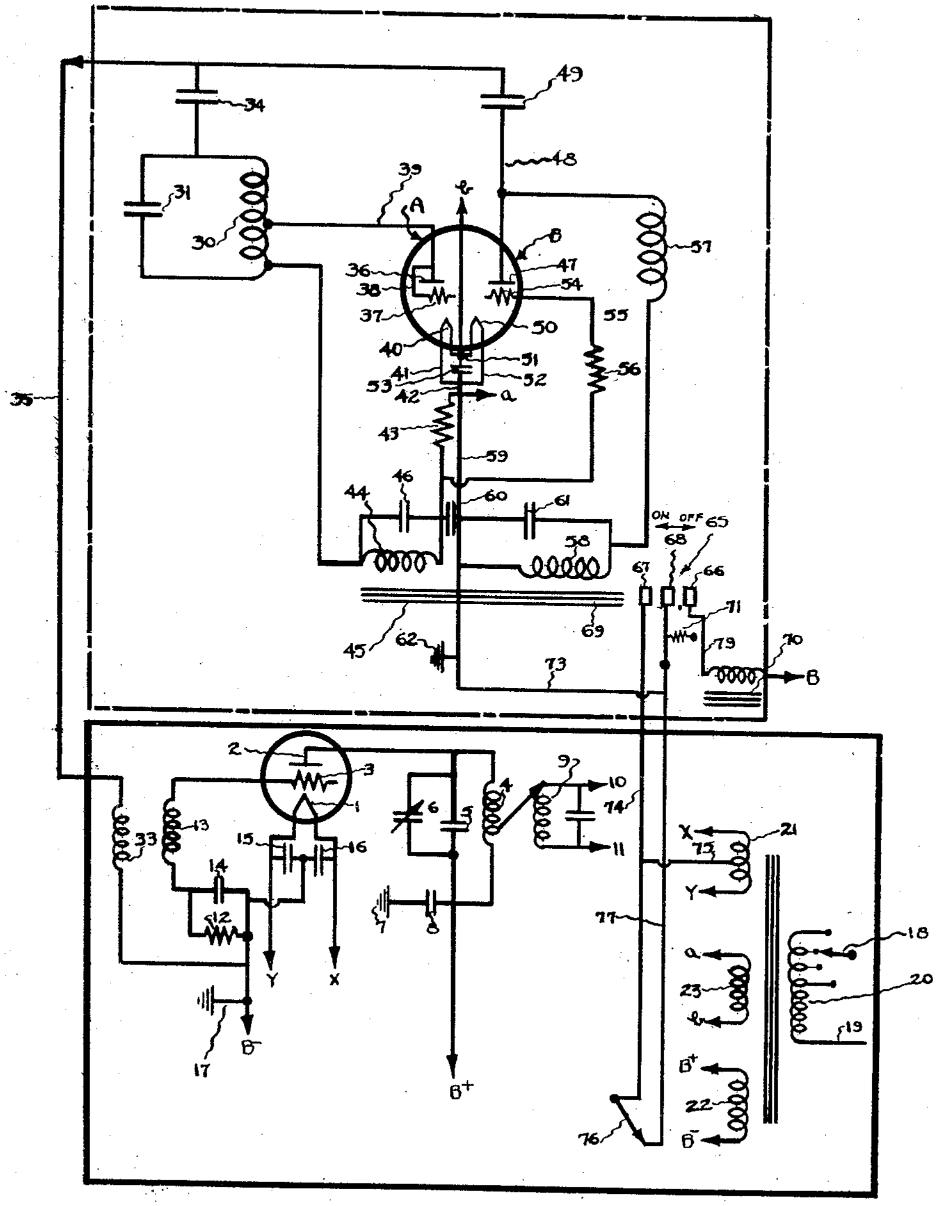
Figure 1 is a diagram of a circuit suitable for use, by way of example, in a diathermy machine adapted for medical treatment purposes.

For the purposes of description, the oscillator portion of the circuit shown in Figure 1 is embraced in the solid lines, while the control apparatus is embraced within the dotted lines. In fact, the control circuit is of such nature that all elements of it, including the control relay and a signal device or the like, conveniently may be housed within a compact casing ready for connection to the oscillator circuit as by means of a plug and socket adapter.

The oscillator circuit with which the frequency controller of the present invention is adapted to be used may be of any conventional electron tube short wave type. The circuit shown comprises a power triode tube having filament 1, a plate 2, and a grid 3. The plate 2 is in connection with a tank coil 4 and a tank circuit condenser 5 which are connected in parallel with one another, and a trimmer condenser 6 shunts the tank circuit condenser 5 for the purpose of enabling accurate adjustment or establishment of the precise frequency at which the oscillator is to operate. The trimmer condenser is utilized to provide compensation when tubes are changed, when the parts may be mechanically misaligned, or to correct the circuit for other variations which may tend to shift the no-load frequency of the generator during its life. The tank circuit is grounded as at 7 through a condenser 8.

An output coil 9, connected to output leads 10 and 11, is adjustably coupled with the tank coil 4.

Grid 3 of the oscillator is in connection with the filament 1 through grid bias resistance 12, this portion of the circuit also including a coupling coil 13, and condensers 14, 15 and 16, respectively, and this portion of the circuit being grounded as at 17.

The oscillator is energized from input leads 18 and 19 which are connected with the primary winding of an input transformer 20 having three secondary windings 21, 22 and 23. Secondary winding 21 is in connection with the filament through the leads $x$ and $y$ as indicated. Secondary winding 22 is in connection with the tank circuit and the tube circuit through the lead $B^+$ and $B^-$. Connection of the third output winding, 23, of the input transformer is described at a later point in the specification.

*Control circuit*

The circuit of the frequency controller device comprises a resonant circuit consisting of an inductance 30 and a capacitance 31 connected in parallel with one another. This resonant circuit is excited from the oscillator through a coil 33 which is coupled to the coil 13 of the oscillator circuit, and through a condenser 34, these elements being interconnected through lead 35.

For the purposes of the present description, the tubes of the control circuit are shown as a pair of triode tubes A and B. In construction, for convenience, these may be consolidated as a unitary double-triode tube, such as tube type IJ6, 3A5 or other suitable unit; however, for the purposes of the present description, the tubes are treated as separate or individual units.

Tube A is employed essentially as a diode or rectifier, therefore the plate 36 of tube A is in connection with its grid 37 through a lead 38, and a part of the voltage across the resonant circuit comprising the inductance 30 and condenser 31 is impressed upon tube A through a lead 39.

Filament 40 of the A unit is in connection, through leads 41 and 42, with a bias resistance 43 and the return circuit from this resistance to the coil 30 includes one winding, 44, of a differential relay which is indicated generally at 45. A condenser 46 bypasses radio-frequency currents around the relay winding.

The portion of the frequency controller circuit just described constitutes a circuit in which the current will decrease whenever the frequency of the oscillator circuit is above or below resonant frequency. Tube B has its plate 47 connected through lead 48 to lead 35 furnishing the input voltage from the oscillator. This circuit contains condenser 49 to prevent direct current from flowing in the coupling coil 33 through which the frequency controller is coupled to the oscillator.

The filament 50 of tube B is connected through leads 51 and 52 to the filament 40 of tube A, whereby both filaments may be energized conveniently from a common source. In the circuit shown in Figure 1, the filaments 40 and 50 are energized through the leads *a* and *b* which are respectively interconnected with the terminals *a* and *b* of the secondary winding 23 of the input transformer, and the respective terminals of the filaments 40 and 50 are shunted by condenser 53.

Grid 54 of tube B is in connection through lead 55 with a grid resistor 56 and thence with the negative terminal of the bias resistor 43 of the resonant circuit just described. A radio-frequency choke coil 57 is connected to the plate 47 of tube B and one terminal of the second winding 58 of the differential relay 45, while the other terminal of the second relay winding 58 is in connection with a lead 59 to the filaments 40 and 50. Capacitor 60 is connected across the lead 59 and the first relay winding 44 to bypass radio-frequency current around the bias resistance 43, and a capacitor 61 is shunted across the second relay winding 58. Lead 59 is grounded as at 62.

For control purposes, in the circuit shown in the drawings, differential relay 45 operates a control switch 65 which is arranged to disrupt the circuit between the filament return and B⁻ connection of the oscillator when frequency variations exceed a predetermined value and also, under such circumstances, to energize a signal device which is indicated generally at 70. Switch 65 comprises two stationary contacts 66 and 67, and an intermediate movable contact 68 which is under the magnetic influence of core 69 of the differential relay 45. The movable contact is attracted into engagement with the stationary contact 67 under predetermined flux conditions of core 69 and a spring 71 urges the movable contact 68 into engagement with stationary contact 66 when the total effective flux of the core 69 drops to a predetermined value.

The $B^-$ connection of the oscillator is grounded as at 17. Contact 68 is grounded as at 62 through a lead 73. Contact 67 is in connection with the filament winding 21 of the transformer through leads 74 and 75. Thus, when contacts 67 and 68 are in engagement with one another the filament return circuit of the oscillator is completed through lead 75 from the transformer, lead 74, contacts 67 and 68, lead 73 to ground 62 and thence from ground 17 to $B^-$ and this circuit is opened to decommission the oscillator when the flux in core 69 of the differential relay 45 subsides to such a point that the spring 71 is able to separate the contact 68 from contact 67.

A short circuiting switch 76, which may be of the instantaneous type, is employed to initially establish completion of the filament return circuit, or to reestablish the circuit independently of contacts 67 and 68 at any time after the circuit has been opened at this point through action of the differential relay. Switch 76 has its contacts respectively connected with lead 74 and lead 77; therefore, when switch 76 is closed the filament return circuit is completed through the filament transformer tap 75 to switch 76, thence through a lead 77 to the lead 73 and through the ground to $B^-$ as previously described.

The signal device 70 controlled by switch 65 is energized from the *a* and *b* terminals of transformer winding 23. For example, the unit shown in the drawings comprises a buzzer having one terminal of its winding connected to the *b* terminal of the transformer winding 23, while the other terminal of the buzzer winding is in connection through lead 79 to the stationary contact 66 of the control switch 65. Upon engagement of contact 68 with contact 66, a circuit for energizing the buzzer is completed through leads 73 and 59 to the *a* terminal of transformer winding 23. In place of a buzzer, a bell, light or other suitable device may be employed.

The operation of the circuit disclosed in Figure 1 is described in more detail as follows: Under proper operating conditions, when the oscillator frequency and the tuned frequency of the resonant circuit of the frequency controller coincide, the current in triode A of the frequency controller is maximum and the current of the triode B is minimum or zero, since the bias of resistor 43 is high. Therefore, the flux of winding 44 of the differential relay 45 is high and the counteractive flux of winding 58 of the differential relay is zero or negligible; hence, contact 68 will reside in engagement with contact 67. However, when the frequency of the oscillator deviates from the prescribed value, the effects thereof are compounded at the differential relay. First, the deviation in frequency causes a decrease in the current of the resonant circuit, that is, the current in the diode or rectifier A is decreased and, the differential relay winding 44 in connection with this portion of the control circuit suffers a loss in flux. This decrease in flux is accompanied by a loss in grid bias of tube B since the bias resistance 43 is a part of the diode circuit. Therefore, more plate current is allowed to flow in the triode tube B, resulting in an increase of counteractive flux in the differential relay winding 58. Hence, as the diode current decreases, the triode current increases. When a predetermined differential exists between the two, the relay opens switch contacts 67 and 68 to disrupt the circuit between the filament and the $B^-$ lead of the oscillator. At the same time, contact 68 engages contact 66 to energize the signal device. When this condition occurs the operator may reset the machine by returning the oscillator circuit through adjustment of the coupling between coils 4 and 9 and by closing switch 76 to reestablish circuit connection between the filament return and $B^-$ of the oscillator. In the manufacture of the unit, for practical purposes, it is convenient mechanically to interconnect the switch 76 with the coupling coil adjusting means of the oscillator such that switch 76 is closed when the coupling coil is moved to zero or to some low coupling value, and opened automatically as the coupling coil adjustment is increased.

Instead of breaking the circuit of the oscillator as just described, the frequency controller apparatus may be arranged to decommission the oscillator by opening a circuit at another point.

Figure 2:
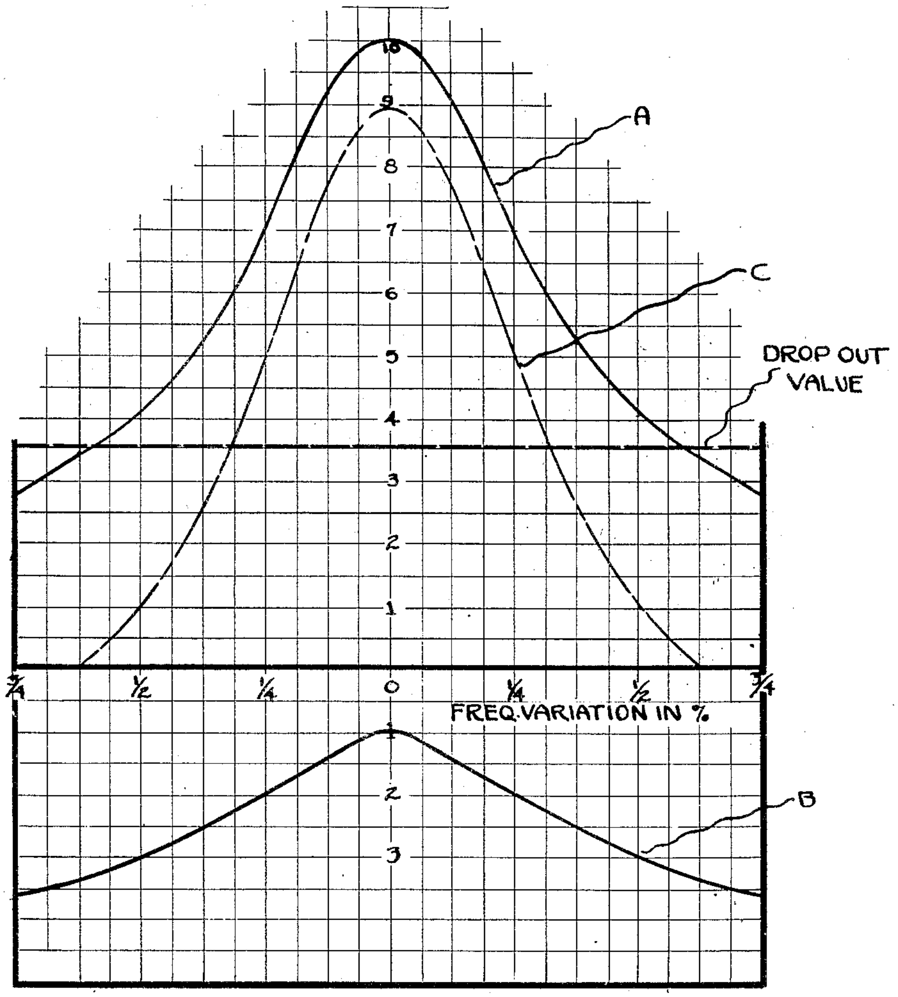
Figure 2 is a chart illustrating the shift of currents in the respective windings of the differential control relay and the net effective results, in response to variations in frequency of the oscillator.

Figure 2 illustrates diagrammatically the responses in the respective windings 44 and 58 of the differential relay 45 which may be obtained in a circuit of this type in terms of D. C. current which is proportional to R. F. voltage. Curve A indicates the variation in current or flux in winding 44 as produced from the diode or A section of the frequency controller tube. Curve B represents the response or counteractive flux in winding 58 of the differential relay 45 in relation to frequency variation. The net effective flux exerted by the differential relay upon movable contact 68 is the difference between the values of curves A and B for a frequency variation of any particular value. Thus, the resultant magnetomotive force on the relay, effective in respect to contact 68, is represented as curve C. If the relay is set for dropout value as indicated by the dotted line on this chart, it will be apparent that the frequency controller is sufficiently sensitive to exert a controlling effect upon the oscillator whenever the frequency varies slightly more than one-quarter of one percent above or below assigned value.

It may be noted that the slope of curve A is representative of the sensitivity or selectivity of a simple resonant circuit while a suitable rate of change is obtained upon deviation of the frequency in the one-eighth of one percent to three-eighths of one percent range, still at greater frequency deviations the curve is too flat to produce a response adapted to be used for some control purposes. However, by the compound effect which is provided through the counteractive flux, as represented by curve B, the net effective flux, that is, the difference between curves A and B through a substantial range of frequency variation, exhibits the desired selectivity inasmuch as the slope of the curve is almost uniformly steep.

A further advantage of the present invention resides in the fact that if there is an overall increase or decrease in the voltage in the resonant circuit, nevertheless the resultant magnetomotive force acting upon relay 45 through the frequency range will coincide substantially with curve C. For example, if an increase of, say, ten percent exists in the voltage of the resonant circuit, there will be a corresponding voltage increase in the B section of the tube; hence, curve A will be shifted upwardly by ten percent, curve B shifted downwardly by ten percent and curve C, the difference between the two, will remain substantially as shown in the chart. Such changes in overall voltage do occur in the operation of the equipment through increase or decrease in line voltage or changes in oscillator tube characteristics, but such changes do not affect the frequency selectivity of the frequency controller.

Figure 3:
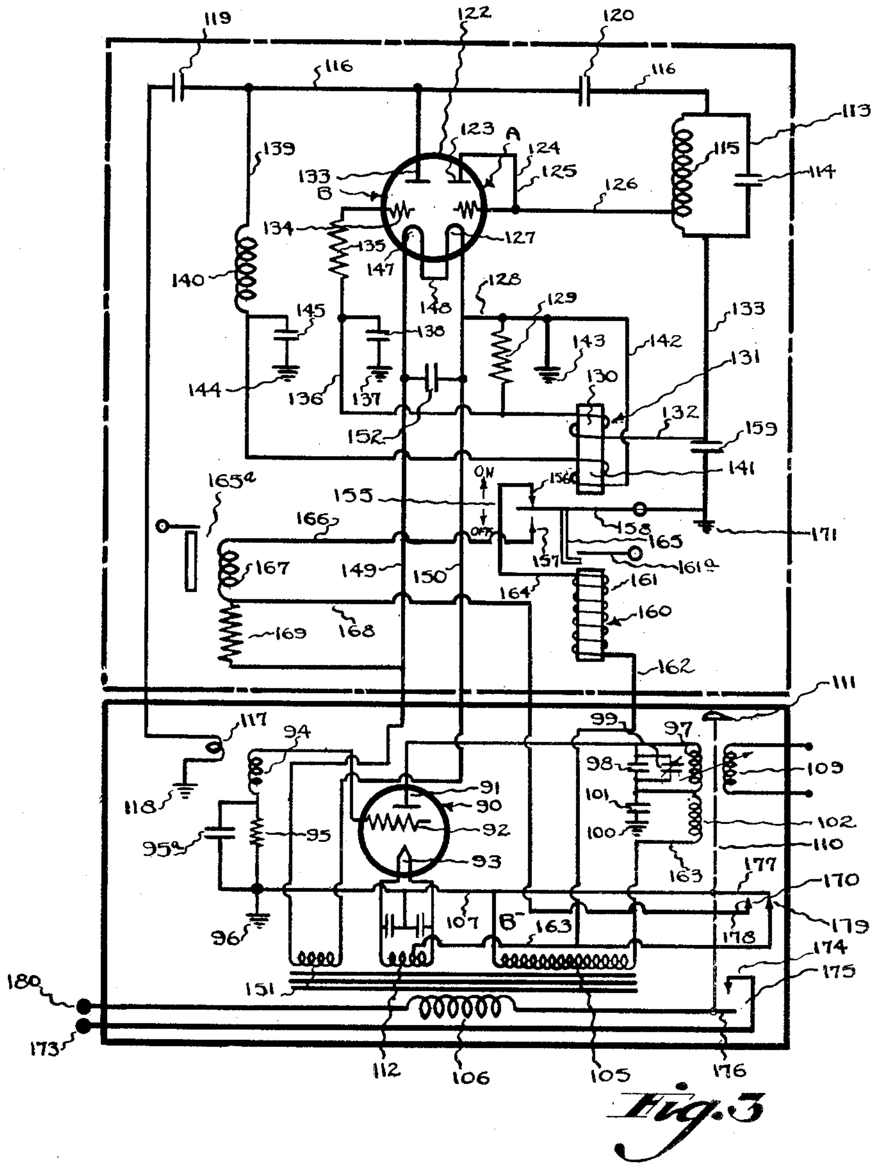
Figure 3 is a modified form of circuit embodying the principles disclosed herein and also incorporating a protective device for preventing damage to the tubes of the oscillator in event of miscoupling.

Figure 3 shows a circuit embodying a frequency control of the type described in conjunction with a device for protecting the plate of the oscillator power tube in event of overload. The oscillator circuit shown in Figure 3 is similar to the oscillator circuit of Figure 1, and comprises a power tube 90 having a plate 91, a grid 92 and a filament 93. The grid is connected through a coil 94 to a resistance 95 which is grounded as at 96, and a condenser 95*a* is connected across the resistance 95.

Plate 91 of the power tube is connected to one terminal of a tank coil 97 having its opposite terminal connected to ground 100 through a condenser 101. A condenser 98 is connected across the tank coil and a trimmer condenser 99 also is associated with this portion of the circuit for the purpose previously described. A radio frequency choke coil 102 has one of its terminals connected to the ground terminal of the tank coil 97 while its other terminal is connected through lead 102 to the $B^+$ terminal of transformer winding 105 of the input transformer. The primary winding of the input transformer is indicated at 106 and the $B^-$ terminal of winding 105 is in connection through lead 107 to the ground 96.

Tank coil 97 of the tank circuit of the oscillator is adjustably coupled with an output coil 109 as previously described. This adjustment is effected through a control shaft 110 having a control knob 111. Shaft 110 serves other switching facilities as described in a later point of the specification.

The filament 93 of the tube 90 is energized from a filament winding 112 of the input transformer 106. These connections are conventional and need not be described.

The frequency controller shown in Figure 3, like the controller shown and described in Figure 1, embodies a resonant circuit indicated generally at 113, including a condenser 114 and a coil 115. This circuit is in connection through lead 116 with a coil 117 coupled to the coil 94 of the oscillator grid circuit. Coil 117 is grounded as at 118 and lead 116 includes condensers 119 and 120.

The frequency controller may include a double triode tube 122 of the type previously described comprising sections A and B. Plate 123 of the A section is in connection with the grid 124 thereof through a lead 125 so as to operate as a rectifier, and is supplied with potential from the resonant circuit 113 through lead 126 taken from coil 115. Filament 127 of the A tube is in connection through lead 128 with a biasing resistor 129, the latter being connected in series with a winding 130 on the differential control relay which is indicated generally at 131. The other terminal of this relay winding is connected through leads 132 and 133 to the resonant circuit 113. Lead 132 is grounded through condenser 159.

In the B section of tube 122, plate element 133 is connected to the lead 116 at a point intermediate condensers 119 and 120, while the grid 134 is connected to a grid resistance 135 from which a lead 136 is taken to the negative terminal of the bias resistor 129. Lead 136 is grounded at 137 through a condenser 138. The plate 133 of the tube B is in connection through leads 116 and 139 with a radio frequency choke coil 140 which in turn is connected to the second winding 141 of the differential relay 131. This winding has its opposite terminal connected to filament lead 128 through the connection 142 which is grounded as at 143, and generates a flux in opposition to the flux of winding 131. The choke coil 140 is grounded at 144 through a condenser 145.

In the tube B the filament 147 has one terminal thereof connected through lead 148 to the filament 127 of the A tube. Both filaments are energized through leads 149 and 150 which are respectively interconnected with a winding 151 of the input transformer 106, and the filament leads 149 and 150 are cross-connected through a bypass condenser 152.

The differential control relay 131 actuates a switch indicated generally at 155, comprising stationary contacts 156 and 157 and an intermediate movable contact 158 which is in connection with ground 171.

A plate current overload relay 160 also is arranged to actuate the movable contact 158. This relay comprises a winding 161 having one of its terminals interconnected through lead 162 to filament return lead 163. The opposite terminal of the winding 161 is connected through lead 164 to stationary contact 156.

Movable contact 158 has a portion thereof 165 offset to a point adjacent the armature 161a of the plate overload relay 160 such that the movable contact 158 is responsive to both the differential relay 131 and the plate overload relay 160. The relays are so designed that the differential relay 131 will hold the movable contact 158 in engagement with the stationary contact 156 under proper frequency conditions and the relay 160 will be ineffective, excepting in the event that plate current of excessive value flows in the filament return lead 163 of the oscillator. When this condition occurs, the armature 161a of overload relay 160 exerts a force on the movable contact 158 sufficient to overcome the flux from the differential relay 131, whereby the movable contact 158 is separated from the contact 156 and the oscillator circuit is thus opened.

The other stationary contact 157 of the control switch 155 is engaged by the movable contact 158 of this switch either when there is excessive frequency shift or excessive plate current and it controls energization of a buzzer or other suitable signal unit 165a. The circuit shown comprises a lead 166 extending from the stationary contact 157 to one terminal of a winding 167 of the buzzer or signal unit. The opposite terminal of this winding is connected through lead 168 to a resistor 169. The other end of the resistor 169 is connected through lead 149 to one side of the transformer winding 151 and the junction between the buzzer winding 167 and the resistor 169 is connected through a lead 168 to a contact 178 on a control switch 170. Thus, the complete circuit to the buzzer includes transformer winding 151, lead 149, resistance 169, the signal unit winding 167, lead 166, the switch contacts 157 and 158 to ground at 171, and thence to the other terminal of the transformer winding 151 through the ground connection 143 and lead 150.

The switching facilities of the machine comprise switch 170 and a second switch 175. Switch 175 controls energization of the input transformer 106 and switch 170 has two functions; it short circuits the buzzer winding during tube warm up so that the buzzer does not operate during the starting period, and it completes a circuit between the B− and the filament return of the oscillator independently of the differential control relay. For diathermy machine purposes, these switches preferably comprise movable contacts which are coupled, for actuation in unison, with control rod 110 which also governs the coupling of the oscillator to the output circuit. By virtue of these facilities, only one knob 111 need be employed as a control for energizing the filaments, placing the oscillator into operation, and adjusting the coupling. The arrangement provides the utmost simplicity because the only other control element which is necessary is a power control which may be arranged in the output circuit connected to coil 109.

For input control, switch 175 has its movable contact 174 connected to one of the input terminals 173. The stationary element 176 is connected to one terminal of the primary winding 106 of the input transformer while the other terminal of the transformer winding is connected to the other input terminal 180. As the control knob is moved from zero to "off" position toward the "on" position, the movable contact 174 engages the stationary contact to energize the input transformer and maintains such engagement during further movement in the same direction of the control knob. The switching operation energizes the filament of the power tube of the oscillator through the winding 112 and also energizes the filaments of the A and B tubes of the frequency controller through winding 151.

At the time of starting the oscillator, contact 158 is in engagement with contact 157 since the differential relay 131 is not energized. Therefore, when leads 149 and 150 are energized upon closure of switch 175, the buzzer circuit would be energized through the resistance 176, contacts 157 and 158 to ground at 171 and thence to the lead 150 through the ground 143. However, since energization of the buzzer would be undesirable during starting period, switch 170 is provided with a contact 178 which serves the purpose of short circuiting the buzzer winding and allowing all of the current in the filament circuit to flow through the resistance 169. To provide this result, switch 170 has its movable contact 177 coordinated with respect to the movable contact 174 of switch 175 such that contact 177 engages contact 178 at the same time contact 174 engages contact 176. The circuit established upon engagement of contacts 177 and 178 comprises contact 177, lead 107 to resistor 95, thence to ground 96 and from ground 96 to ground 171 through contacts 158 and 157 through lead 166, thence through buzzer winding 167 to the short circuit contact 178. By means of this circuit all of the current is caused to flow through the resistance 169 and the buzzer or signal does not operate.

For practical purposes, it is desirable to allow a momentary period for the tubes to warm up before placing the oscillator into operation, that is, before completing the circuit from B− to the filament. Provision of a detent or hold position for the knob 111, at which contact 177 is in engagement with contact 178, serves this purpose.

As the control knob 111 is moved beyond the hold position, contact 177 momentarily sweeps past a stationary contact 179 and at the same time leaves engagement with the contact 178. Contact 179 is connected to the filament tap lead 163; therefore, the momentary engagement of contacts 177 and 179 completes the circuit between B− and the filament of the oscillator and when the oscillator starts to operate the frequency control circuit is energized which allows the differential relay 131 to assume control of the machine. At this moment, the control contact 158 is moved into engagement with the control contact 156 which breaks the buzzer circuit. Once the contact 158 has engaged contact 156, the circuit between filament and B− of the oscillator is maintained from the filament tap through lead 163 to lead 162 through the plate control relay winding to the stationary contact 156, then through the contact 158 to the ground at 171 and from here to ground 96 which is in connection with the grid of the power tube through resistance 95. When this circuit is completed, the machine is in full operation. Since contact 177 is no longer in engagement with contact 178, the buzzer circuit is not short circuited but is ready to provide a signal should any frequency deviation occur which will allow the differential relay to drop out. Also, since the engagement of contacts 177 and 179 was momentary only, the differential relay functions to control the circuit. In event of plate overload independently of any frequency variations, relay 160 controls the movable contact 158 and actuates the signal to indicate the undesirable condition.

In the circuit shown, the current flowing in the plate overload relay 160 is the summation of the plate and grid currents. In the alternative, a differential relay may be substituted for the relay 160 for actuation in accordance with the difference between the plate and grid currents as described in United States Patent No. 2,261,153 to Carl K. Gieringer. It also may be noted that while the plate circuits of the triode tubes of the frequency controllers shown in Figures 1 and 3 are connected to the resonant circuits for excitation by the oscillator, the plates of these tubes may be energized from any suitable source such as sixty (60) cycle alternating current or forming independent circuit of higher frequency.

For convenience, in the construction of the apparatus, frequency controllers of the type shown in Figures 1 and 3 may be built as separate units having plugs arranged for engagement with sockets through which the circuit connections may be established to the oscillator.

Having described our invention, we claim:

1. In combination, an oscillator, a switch for disrupting oscillator operation, a differential relay for controlling said switch, a first circuit connected to derive a voltage from the oscillator and including a rectifier connected to energize one winding of said differential relay, and a second circuit connected to energize the other winding of the differential relay, said second circuit including a triode tube, and means for biasing the grid of the tube by a voltage derived from the first circuit, whereby a decrease in the voltage derived from the resonant circuit, attending a variation in frequency from resonance thereof, is manifest as a compound effect upon the differential relay through an increase in the current flowing in the second circuit.

2. The combination with an oscillator of a frequency monitor responsive to frequency deviations of said oscillator, said monitor comprising; a differential relay, an oscillator control switch responsive to said differential relay, a resonant circuit for energizing one winding of said relay and a relay sensitizing circuit in connection with said resonant circuit and with the other winding of said relay, said relay sensitizing circuit being constructed and arranged to generate in the second winding a flux counteracting the effect of the first flux in respect to energization thereof by said resonant circuit.

3. A frequency controller for an oscillator comprising; an oscillator control switch, a differential relay for actuating said switch, a resonant circuit for deriving a voltage from an oscillator, a rectifier energized from the resonant circuit, a differential relay having one winding connected for energization from said rectifier, said rectifier having a biasing resistor connected therewith, and a triode tube for energizing a second winding of said differential relay in opposition to energization by the first relay, said triode tube having its grid subject to a negative bias by said biasing resistor.

4. The combination with an oscillator of an oscillator control switch, a differential relay for controlling said switch to off and on positions, a resonant circuit connected to derive a voltage from said oscillator including a rectifier connected to energize one winding of said differential relay, said rectifier having a biasing resistor connected therewith, and a triode tube connected differentially to energize a second winding of said control relay, said triode tube having its grid subject to a negative bias from said biasing resistor and its plate in connection with said resonant circuit.

5. The combination of an oscillator, a control switch for said oscillator, a differential relay for controlling said switch and having windings for generating opposed fluxes, a triode tube for energizing one of said windings, a rectifier for energizing the other of said windings, said rectifier having a biasing resistor in connection therewith, means for biasing said triode tube by the current flowing in said biasing resistor, and a resonant circuit connected to derive a voltage from said oscillator for energizing said rectifier.

6. The combination of an oscillator, a control switch for said oscillator, a differential relay for controlling said switch and having windings for generating opposed fluxes, a triode tube for energizing one of said windings, a rectifier for energizing the other of said windings, said rectifier having a biasing resistor in connection therewith, means for biasing said triode tube by the current flowing in said biasing resistor, and a resonant circuit connected to derive a voltage from said oscillator for energizing said rectifier whereby the voltage in said resonant circuit is maximum at a predetermined resonant frequency, and whereby decrease in voltage from resonant frequency is manifest as a compound effect at said differential relay.

7. A short wave oscillator including an electronic power tube, an overload relay in connection with the plate circuit of said tube, an oscillator control switch movable to off and on positions, said control switch being responsive to said overload relay in event of excessive plate current conditions in said oscillator, a differential relay also arranged for actuation of said switch in response to variations of predetermined magnitude from a predetermined frequency of operation of said oscillator, and means for energizing said differential relay comprising; a rectifier for energizing one winding of said relay, a resonant circuit connected to derive a voltage from said oscillator for energizing said rectifier, a triode tube arranged differentially to energize a second winding of said relay, and means for furnishing a negative bias to the grid of said triode tube proportional to the current flowing in said rectifier, said differential relay being constructed to hold said oscillator control switch in closed position against the effect of said overload relay while the oscillator is operating within a predetermined range of frequency and to open said switch in event of plate current overload or in the event of frequency deviation of said oscillator beyond a predetermined range.

8. In an oscillator having an electronic power tube, an oscillator control switch and a pair of control relays for actuating said switch, one of said relays being in connection with the plate circuit of said tube for actuating said switch to off position when the plate current exceeds a predetermined value and a frequency responsive device, connected with said oscillator for excitation thereby for actuating said control switch through the second of said relays upon deviation in the frequency of said oscillator beyond a predetermined frequency band.

9. In an oscillator having an electronic power tube, an oscillator control switch and a pair of control relays for actuating said switch, one of said relays being in connection with the plate circuit of said tube for actuating said switch to off position when the plate current exceeds a predetermined value, a frequency responsive device, connected with said oscillator for excitation thereby for actuating said control switch through the second of said relays upon deviation in the frequency of said oscillator beyond a predetermined frequency band, and a signal device in partial circuit connection with said control switch including a circuit completing contact at said control switch which is engaged upon actuation of said control switch to off position.

10. In an oscillator having a power tube, a relay in connection with the plate circuit of said tube and arranged to be energized when the plate current exceeds a predetermined value, a resonant circuit connected with said oscillator for excitation thereby, a differential relay having one winding in connection with said resonant circuit so as to generate a flux in response to voltages in said resonant circuit, means for producing a counteractive flux in the second winding of the differential relay in response to voltage variations in the resonant circuit coincidental with deviations in frequency of said oscillator beyond the predetermined frequency band, an oscillator control switch responsive to both relays for actuation thereby to off position, an input control switch for said oscillator and means for placing said oscillator in operation independently of the second of said relays.

11. In an oscillator having an electron power tube, a relay in connection with the plate circuit of said tube and arranged to be energized when the plate current exceeds a predetermined value, a resonant circuit connected with said oscillator for excitation thereby, a differential relay having one winding connected with said resonant circuit to produce a magnetic force in response to voltage variations therein, means in circuit connection with the resonant circuit and the second winding of the differential relay for producing in said second winding a magnetic force counteracting that in the first winding as caused by variations in the voltage of the resonant circuit in response to deviations in frequency of said oscillator beyond the predetermined frequency band, an oscillator control switch responsive to both relays for actuation thereby to off position, an input control switch for said oscillator, and means for placing said oscillator in operation independently of the second of said relays including a device for short circuiting said second relay.

12. In an oscillator having a power tube, an oscillator control switch having off and on positions, means for completing a circuit to the grid of said tube in "on" position of said switch, a signal device, means for completing a circuit to said signal device in off position of said switch, a relay for holding said switch in "on" position, a resonant circuit connected with said oscillator for excitation thereby, means for controlling said relay by said resonant circuit whereby said switch is actuated to off position upon deviation in frequency of said oscillator beyond a predetermined frequency band, an input control switch for said oscillator, and means for starting said oscillator independently of said relay.

13. In an oscillator having a power tube, an oscillator control switch having off and on positions, means for completing a circuit to the grid of said tube in "on" position of said switch, a signal device, means for completing a circuit to said signal device in off position of said switch, a relay for holding said switch in "on" position, a resonant circuit connected with said oscillator for excitation thereby, means for controlling said relay by said resonant circuit whereby said switch is actuated to off position upon deviation in frequency of said oscillator beyond a predetermined frequency band, an input control switch for said oscillator, and means for starting said oscillator independently of said relay and means for coordinately short circuiting said signal device until said relay has been energized through said resonant circuit to actuate said switch to on position.

14. The combination, with an oscillator, of an oscillator control switch, a differential relay for controlling said switch, a resonant circuit connected with said oscillator for excitation thereby, means for energizing one winding of said differential relay from said resonant circuit, and means operated in conjunction with said resonant circuit for inversely energizing the other winding of said differential relay to provide an increased flux effect therein attending deviations in frequency of said oscillator, whereby predetermined sensitivity of said differential relay is maintained independently of oscillator voltage.

15. The combination with an oscillator of an oscillator control switch, a differential relay for controlling said switch, a resonant circuit connected with said oscillator for excitation thereby, means for energizing said one winding of differential relay from said resonant circuit, and means operated in conjunction with said resonant circuit for inversely energizing the other winding of said differential relay to provide an increased flux effect therein attending deviations in frequency of said oscillator whereby predetermined sensitivity of said differential relay is maintained independently of oscillator voltage, and whereby substantially uniform sensitivity of said relay is maintained through a predetermined frequency band.

16. An oscillator circuit having a tank coil, an output coil coupled therewith, a control member for varying the coupling of the output coil with the tank coil, an oscillator control switch, a resonant circuit responsive to oscillator frequency for actuating said control switch upon deviation of oscillator frequency beyond a predetermined frequency band, a signal circuit, means for energizing said signal circuit upon actuation of said oscillator control switch by said frequency monitor, an input control switch for said oscillator, and an oscillator starting switch for momentarily governing said oscillator independently of said oscillator control switch, both of said latter switches being coupled with said control member for actuation in unison therewith.

CARL K. GIERINGER.
ARTHUR G. BILLIN.

REFERENCES CITED

The following references are of record in the file of this patent:

UNITED STATES PATENTS

| Number | Name | Date |
|---|---|---|
| 2,261,153 | Gieringer | Nov. 4, 1941 |